July 4, 1939.  W. E. BECKJORD  2,164,487
TRANSMISSION
Filed Feb. 9, 1938  2 Sheets-Sheet 1
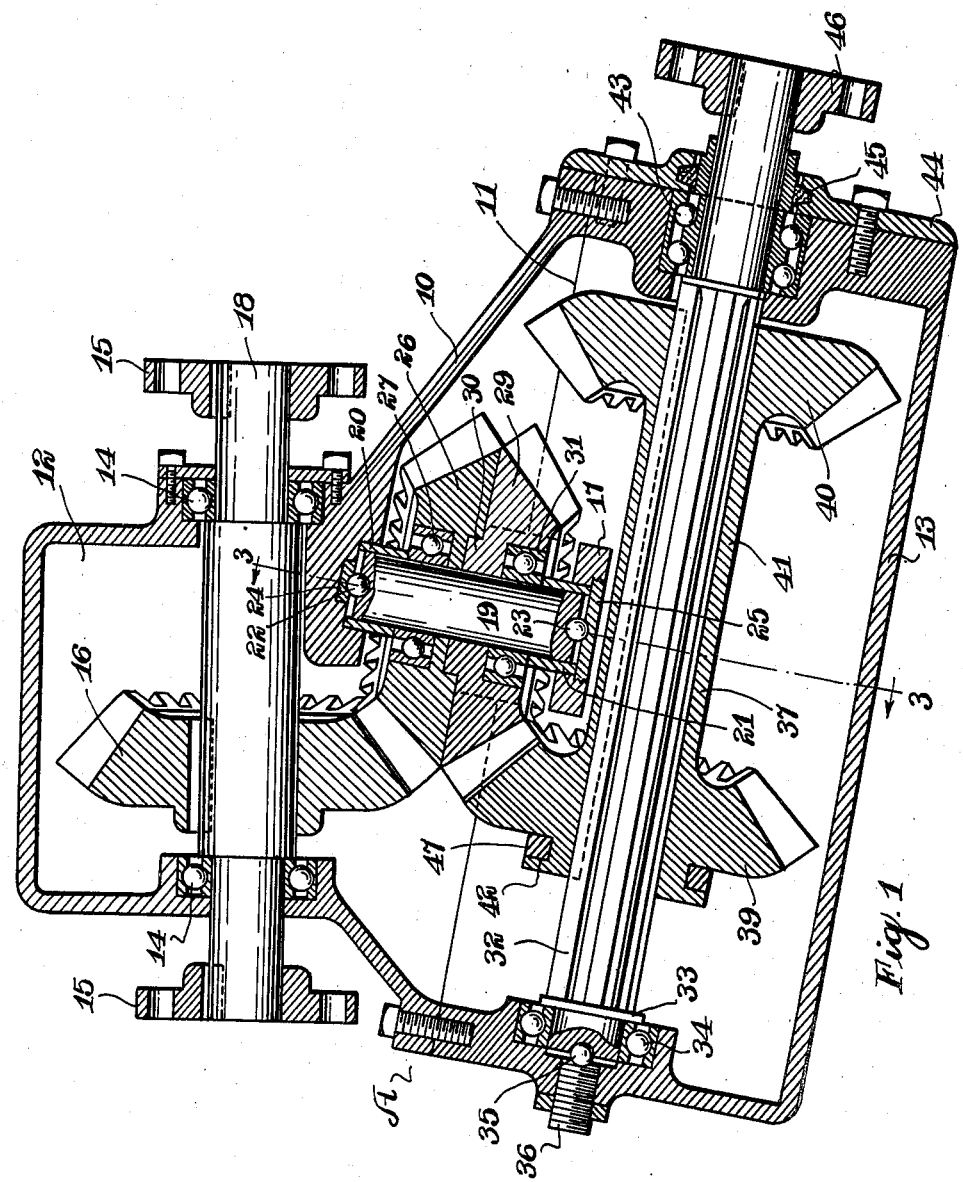
Inventor
William E. Beckjord
By Howard Fische
Attorney July 4, 1939.                 W. E. BECKJORD                2,164,487
                                TRANSMISSION
                              Filed Feb. 9, 1938          2 Sheets-Sheet 2
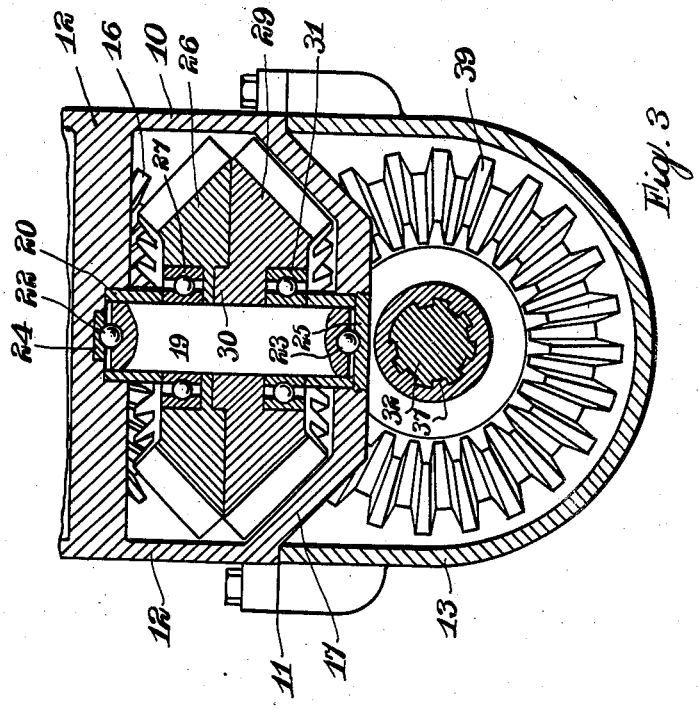
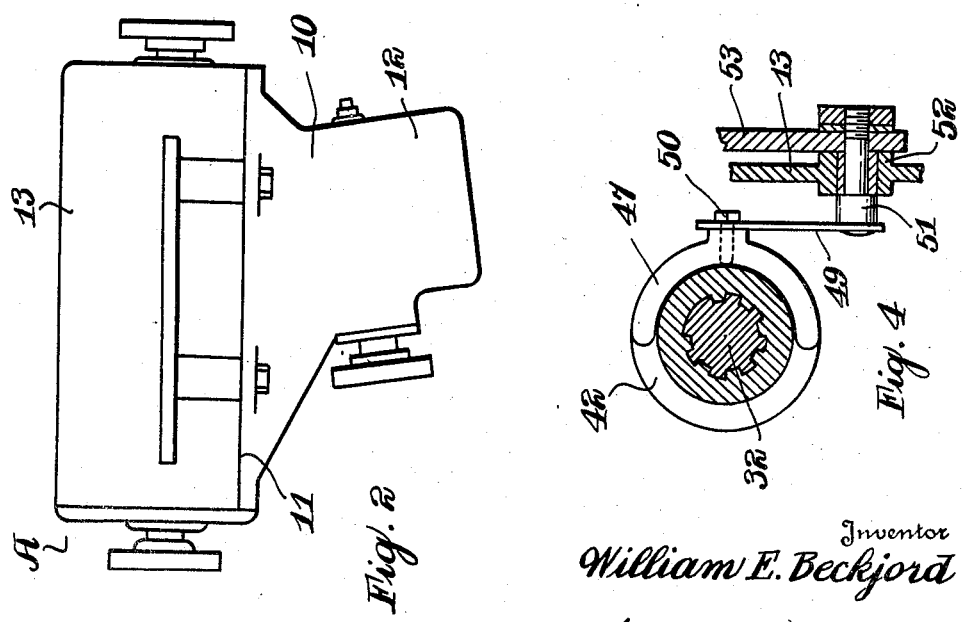
Inventor
William E. Beckjord
By
Attorney Patented July 4, 1939

2,164,487

UNITED STATES PATENT OFFICE 2,164,487

TRANSMISSION

William E. Beckjord, St. Paul, Minn.

Application February 9, 1938, Serial No. 189,619

6 Claims. (Cl. 74—355)

My invention relates to an improvement in transmissions wherein it is desired to provide an angle drive.

In the use of internal combustion engines and the like, it is highly desirable to position the engines on as nearly a level plane as possible. It will be understood that where the engine is longitudinally tilted, the pistons bear more heavily against one surface of the cylinder walls, causing uneven wear within the cylinders. Furthermore, the tilting of the engine permits the oil within the crank case to be deeper at one end, thereby requiring special crank case formation if the engine is to be tilted.

In the use of an internal combustion engine for operating a boat or the like, the simplest construction is to tilt the engine so that the propeller shaft may incline rearwardly and downwardly. Because of the difficulties arising from tilting the engine, however, it is highly desirable to provide an angle drive so that the engine may rest upon a horizontal plane while the propeller shaft extends at a considerable angle to the horizontal.

It is a purpose of the present invention to provide an angle drive which may be driven from either the forward or rear side of the drive and which transmits rotary motion from the motor to the propeller shaft without loss of power. While angle drives have previously been constructed, those with which I am familiar are provided with friction or other partially positive means through which the power is transmitted, lowering the efficiency of these former constructions. It is a purpose of my invention to provide a single angle drive which embodies a reversing mechanism and an optional gear ratio. Accordingly, a single compact unit may be provided to reverse the direction of rotation of the propeller shaft or to stop rotation thereof. It is also possible with my construction to change the gear ratio, thus varying the speed of rotation of the propeller shaft with respect to that of the engine.

It is a further feature of my invention to provide a transmission which is extremely simple in construction and which utilizes some of the gears necessary to provide a reversal of movement for effecting the angle drive. Thus the present construction embodies a mechanism for producing an angle drive, which mechanism is but slightly more costly and complicated than the reversing mechanism which is ordinarily applied. The device is extremely simple, but is sturdily constructed to withstand the strain which may be placed upon it and is thus extremely dependable for use.

These and other objects and novel features of my invention will be more clearly and fully set forth in the following specification and claims.

In the drawings forming a part of my specification:

Figure 1 is a longitudinal cross-sectional view through my transmission.

Figure 2 is a side elevation view of my transmission inverted.

Figure 3 is a cross-sectional view through the transmission indicated by the line 3—3 of Figure 1.

Figure 4 is a cross-sectional view of the gear shifting means.

The transmission A is provided with a casing 10 which is split at 11 to divide the casing into an upper portion 12 and a lower portion 13. It will be understood that division line 11 may not be in the position illustrated, as the casing 10 may be divided in any desirable manner. In some forms of construction, I provide the dividing line 11 at a point near the lower extremity of the same so that the lower portion may form a pan or cover depending upon whether or not the transmission is in the position shown or is inverted.

A shaft 18 extends through the upper portion 12 of the casing 10 and is supported upon bearings 14 of any suitable type. Connecting plates 15 may be mounted on either end of the shaft 18 and a gear 16 is keyed to the shaft 13 within the housing or casing 10.

A yoke 17 best illustrated in Figure 3 of the drawings, is connected at either end to the side walls of the upper portion 12 of the casing 10, and acts to support the end of a short pinion shaft 19. The shaft 19 is supported within sleeves or bushings 20 and 21 at the upper and lower extremities thereof and the end thrust upon the pinion shaft 19 is taken up by the bearings 22 and 23 respectively. The bearing 22 engages an upper thrust bushing 24 mounted in a casing portion 12, while the lower bearing 23 is supported by a removable threaded adjustable bushing 25.

An upper pinion beveled gear 26 is mounted upon a bearing 27 on the pinion shaft 19, which beveled gear engages the beveled gear 16 mounted on the shaft 18. The angle between the beveled gears 16 and 26 is preferably greater than ninety degrees. This angle between gears 16 and 26 is fixed and the particular angle desired formed when the transmission is designed.

A lower pinion beveled gear 29 is provided with a polygonal boss 30 which fits in a cooperable socket in the lower surface of the gear 26 to prevent relative rotation between the gears 26 and 29. The lower beveled gear 29 is supported on the shaft 19 by a suitable bearing 31. The bushings 20 and 21 support the gears 26 and 29 in engagement and prevent these gears from moving longitudinally upon the pinion shaft 19.

A shaft 32 is mounted in the lower portion 13 of the casing 10 at an angle with respect to the shaft 18. The shaft 32 extends at right angles to the shaft 19 so that the angle which the shaft 32 makes with the shaft 18 is governed by the angle between the gears 16 and 26.

In the drawings, I disclose a collar 33 on the shaft 32 which engages against a propeller shaft end bearing 34. A thrust bearing 35 provided with an adjusting set screw 36 takes up the end thrust on the shaft 32. The shaft 32 is splined within the casing 10 to permit a gear cluster 37 to slide longitudinally thereupon.

The gear cluster 37 includes a beveled gear 39 and a beveled gear 40 in opposed relationship and connected by a sleeve portion 41. A circumferential groove 42 is provided adjacent one end of the gear cluster 37 to provide a means of moving the cluster longitudinally on the shaft 32 in a manner which will be later disclosed in detail. It will be obvious however, that when the gear 39 is in mesh with the gear 29 the shaft 32 will rotate in one direction while when the gear 40 engages the opposite side of the gear 29 the shaft 32 will be rotated in the opposite direction.

The end of the shaft 32 opposite that supported in the bearing 34 is supported by a suitable bearing 43, and an end plate 44 supports a backing joint or oil seal 45. A connecting plate 46 is mounted on the end of the shaft 32 externally of the end plate 44 for connection with a propeller shaft or the like. The bearing 43 is a two-way thrust bearing.

Any suitable mechanism for slidably moving the cluster of gears 37 with respect to the shaft 32 may be used. In Figure 4 of the drawings is shown one construction which may be used for this purpose. A ring or yoke 47 is provided in the groove 42 which ring or yoke may be held stationary while the gears rotate. A crank arm 49 is pivoted at 50 to the yoke or ring 47. This crank arm 49 is mounted upon a pivot pin 51 and extends through a boss 52 in the wall of the lower portion 13 of the casing or housing 10. A shifting arm 53 is mounted to rotate with the pin 51 so that by movement of the lever 53 the yoke or ring 47 may be moved longitudinally with respect to a shaft 32, sliding the gear cluster 37 along this shaft 32.

From the foregoing description of the drawings, it will be apparent that the shaft 18 may be used as the drive shaft and the rotative movement may be transferred through the gears 16, 26, 29, and either the gear 39 or the gear 40, to drive the driven shaft 32. In Figure 2 of the drawings however, I disclose my transmission in inverted position, whereupon the shaft 32 would form the drive gear and would act selectively through either the gear 39 or the gear 40 to the gears 29, 26, and 16 to drive the shaft 18.

In order to provide a gear ratio which may be greater or smaller than that disclosed, the gear 29 may be removed and replaced with a larger or smaller beveled gear 29. By making this simple change, the gear ratio between the driving shaft and the driven shaft may be adjusted. The change requires no change in the casing or in the design of the transmission, and thus a gear reduction may be easily accomplished in a short period of time.

In accordance with the patent statutes, I have described the principles of construction of my transmission; and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. A transmission assembly comprising a case, a drive shaft extending through said case, a driven shaft extending through said case in oblique relation with respect to the drive shaft, a countershaft between the drive and driven shafts, beveled gears on the countershaft, a beveled gear on the drive shaft meshing with one of the beveled gears on the countershaft, and a beveled gear on the driven shaft meshing with the remaining beveled gear on the countershaft, said countershaft being supported on internal extensions of said case.

2. A transmission including a casing, a shaft extending thereinto, a pinion shaft within said casing, a bearing on said casing supporting one end of said pinion shaft, a yoke extending transversely of said casing, a bearing on said yoke supporting the other end of said pinion shaft, cooperating beveled gears on said first shaft and said pinion shaft, a second shaft extending in an oblique direction with respect to said first shaft, and cooperable reversing gear means on said pinion shaft and said second shaft.

3. A transmission including a casing, a shaft extending thereinto, a pinion shaft within said casing, a yoke extending transversely of said casing, bearing means on said yoke supporting said pinion shaft, cooperating beveled gears on said first shaft and said pinion shaft, a second shaft extending in oblique direction with respect to said first shaft, and cooperable reversing gear means on said pinion shaft and on said second shaft.

4. A transmission including a casing, a shaft extending thereinto, a pinion shaft within said casing, a yoke extending transversely of said casing, bearing means on said yoke supporting said pinion shaft, cooperating beveled gears on said first shaft and said pinion shaft, a second shaft extending in oblique direction with respect to said first shaft, and beveled gear means connecting said pinion shaft and said second shaft.

5. A transmission including a casing, a shaft extending thereinto, a pinion shaft within said casing, a bearing on said casing supporting one end of said pinion shaft, a yoke extending transversely of said casing, a bearing on said yoke supporting the other end of said pinion shaft, cooperating beveled gears on said first shaft and said pinion shaft, a second shaft extending in oblique direction with respect to said first shaft, and beveled gears connecting said pinion shaft and said second shaft.

6. A transmission including a casing, said casing including side walls and end walls, a shaft extending through one of said end walls, a pinion shaft within said casing, projection means on one of said side walls, a bearing on said projection means supporting said pinion shaft, cooperating beveled gears on said first shaft and said pinion shaft, a second shaft extending through one of said end walls in oblique direction with respect to said first shaft, and cooperable beveled gears on said pinion shaft and said second shaft.

WILLIAM E. BECKJORD.